(No Model.)  W. HALKYARD.  5 Sheets—Sheet 1.
Machine for Making Lacing Hooks.

No. 242,772. Patented June 14, 1881.

WITNESSES:
Joseph A. Miller Jr
Wm. L. Cox

INVENTOR:
William Halkyard
by Joseph A. Miller
Att'y (No Model.) W. HALKYARD. 5 Sheets—Sheet 3.
Machine for Making Lacing Hooks.

No. 242,772. Patented June 14, 1881.

WITNESSES:
Joseph A. Miller Jr
Wm L. Cook

INVENTOR:
William Halkyard
by Joseph A. Miller
atty (No Model.)  5 Sheets—Sheet 4.
W. HALKYARD.
Machine for Making Lacing Hooks.
No. 242,772.  Patented June 14, 1881.
Fig. 4.
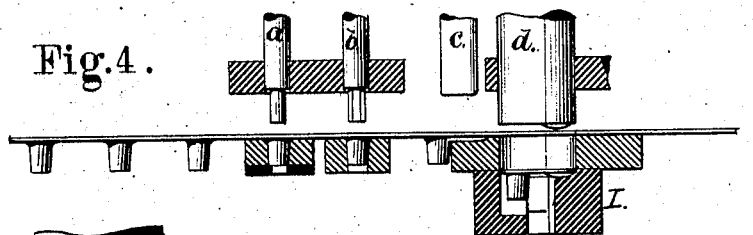
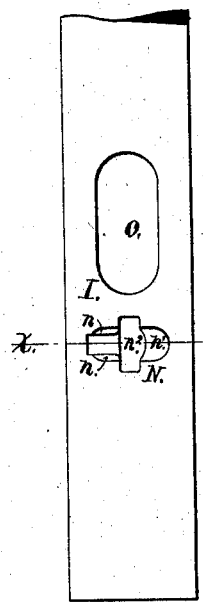
Fig. 5.
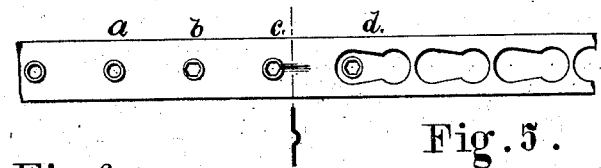
Fig. 6.
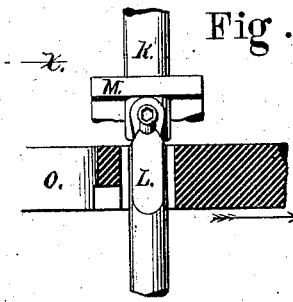
Fig. 11.
Fig. 12.
Fig. 8. Fig. 9. Fig. 10.
Fig. 7.
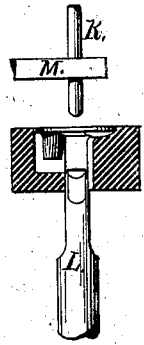 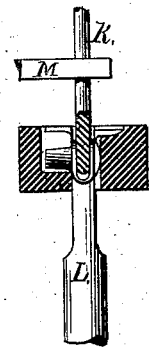 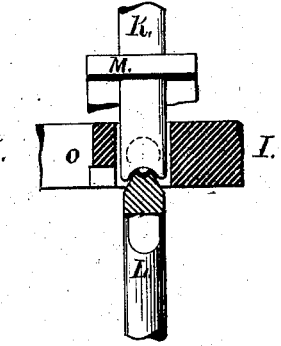
WITNESSES:
Joseph A. Miller Jr
Wm. L. ___
INVENTOR:
William Halkyard
by Joseph A. Miller
  att'y (No Model.)

W. HALKYARD.
Machine for Making Lacing Hooks.

No. 242,772.

5 Sheets—Sheet 5.

Patented June 14, 1881.

WITNESSES:
Wm. L. Coops.
Henry J. Miller

INVENTOR:
Wm Halkyard
by Joseph A. Miller, atty

UNITED STATES PATENT OFFICE.

WILLIAM HALKYARD, OF PROVIDENCE, RHODE ISLAND.

MACHINE FOR MAKING LACING-HOOKS.

SPECIFICATION forming part of Letters Patent No. 242,772, dated June 14, 1881.

Application filed March 26, 1881. (No model.)

*To all whom it may concern:*

Be it known that I, WILLIAM HALKYARD, of the city and county of Providence, and State of Rhode Island, have invented a new and useful Improvement in Machines for Making Lacing-Hooks; and I hereby declare that the following is a full, clear, and exact description of the same, reference being had to the accompanying drawings, forming part of this specification.

This invention has reference to an improvement in the construction of machines for punching, shaping, and forming lacing-hooks from a strip of metal fed automatically to the machine.

The invention consists in the peculiar and novel construction of the carrier and the devices for bending and crimping the lacing-hook, as will be more fully set forth hereinafter.

In machines for making lacing-hooks, as heretofore constructed, three operations were required to bend and form the lacing-hooks out of the blank after it had been cut from the strip; a carrier had to be provided to carry the blank from one tool to the other, and as all the parts have to work successively a slight wearing of the cams or connections caused imperfect work or the stopping of the machine. To avoid this difficulty I bend and form the cut-out blank, at one operation, into the lacing-hook, and give to the carrier a simple reciprocating motion.

Figure 1:
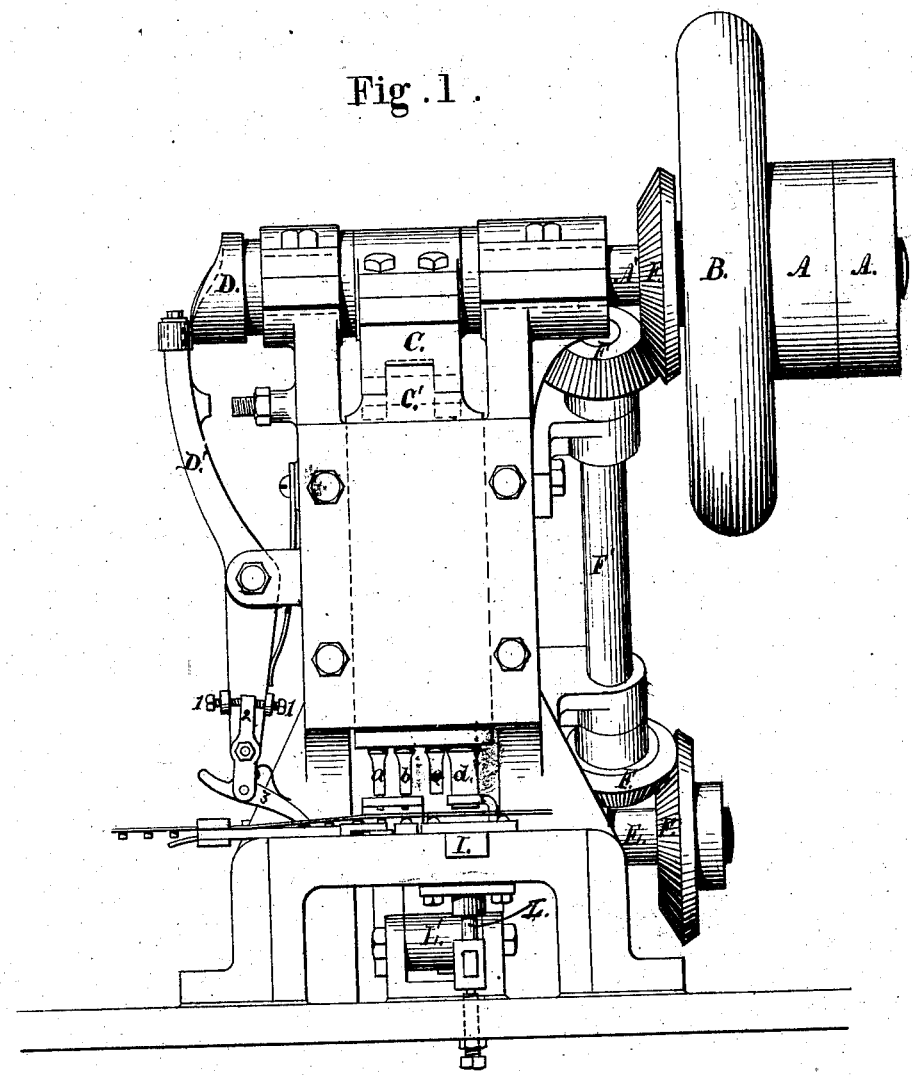
Figure 2:
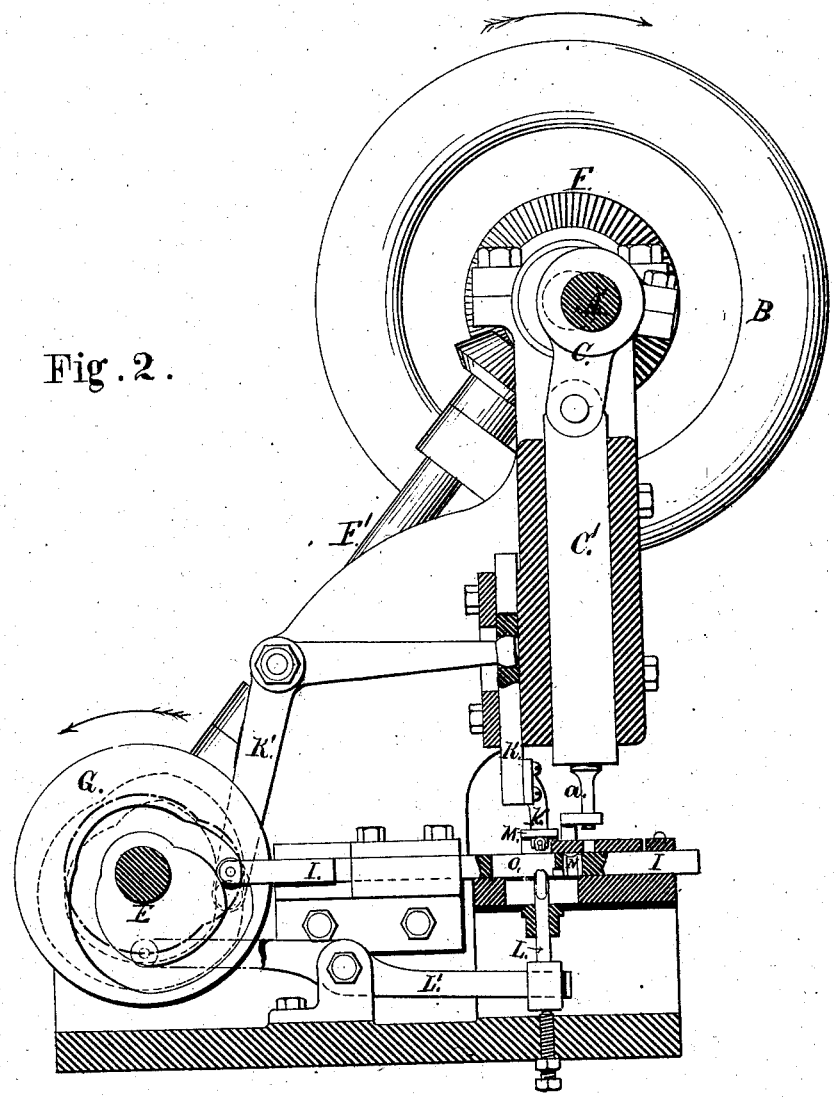
Figure 3:
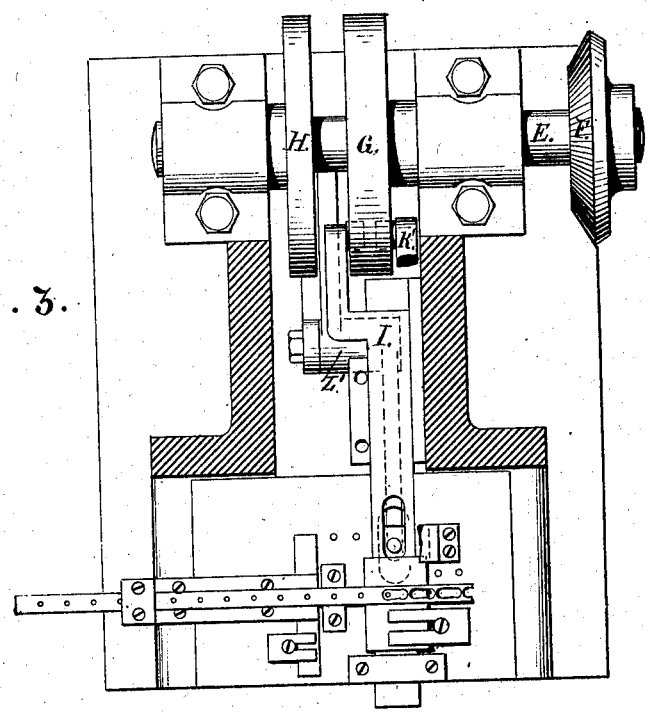
Figure 13:
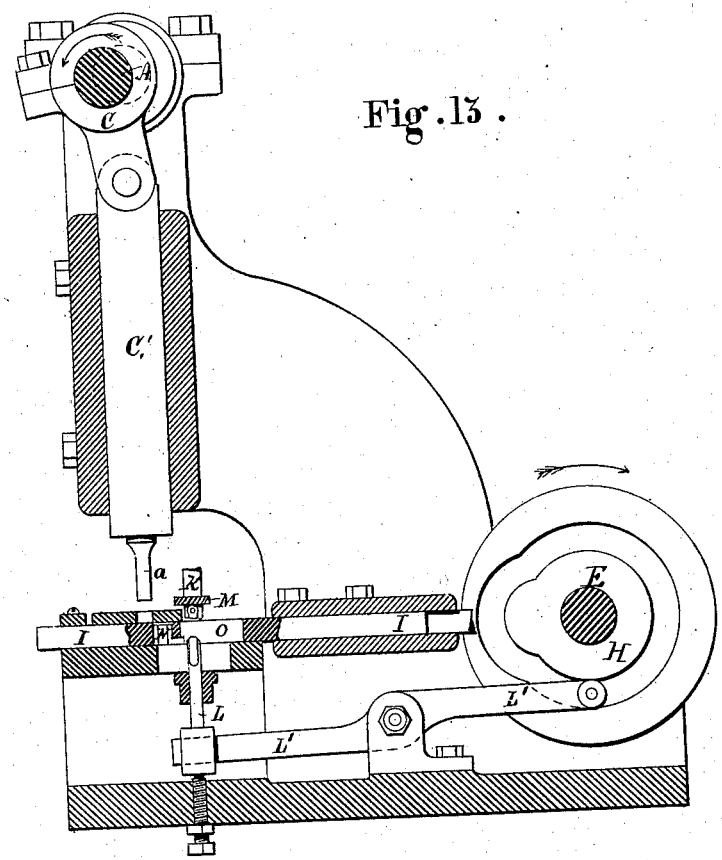

Figure 1 is a front view of my improved lacing-hook machine. Fig. 2 is a vertical sectional view of the same. Fig. 3 is a plan view of the bed of the machine, showing the cams for operating the carrier and the bending devices. Fig. 4 is an enlarged skeleton view, showing the strip of metal prepared with cups to form the eyelet, the punch for punching out the bottom from the eyelet, the punch for scoring the lower end of the eyelet, the punch for forming the rib on the neck of the blank, and the punch for cutting out the blank and cupping the portion forming the head of the lacing-hook. Fig. 5 is a view of the strip of metal, showing the effect produced by each punch. Fig. 6 is a view of the carrier. Fig. 7 is a sectional view through the line $x\,x$ of Fig. 6. Fig. 8 is a view showing the blank resting in the carrier before the bending-plunger descends. Fig. 9 is a view showing the bending-plunger when it has descended and bent the lacing-hook. Fig. 10 is a view of the anvil and bending-plunger, shown at right angles to Fig. 9. Fig. 11 represents the anvil and bending-plunger with the lacing-hook raised above the carrier. Fig. 12 is a view of the finished lacing-hook. Fig. 13 is a sectional view of the machine, showing the cam H and the lever L in contact with the cam.

In the drawings, A A are the fast and loose pulleys secured to the driving-shaft A′ of the machine.

B is a balance-wheel.

C is an eccentric or crank-strap connecting the plunger C′ with the driving-shaft, so that at each rotation of the driving-shaft the plunger C′ is vertically reciprocated.

To the plunger C′ the punches $a$, $b$, $c$, and $d$ are secured. They reciprocate with the plunger, and all act on the strip of metal at each downward reciprocation of the plunger. The punch $a$ cuts the bottom out of the eyelet, the punch $b$ scores the lower end of the eyelet, the punch $c$ crimps the metal so as to form the rib on the neck, and the punch $d$ cuts the blank from the strip.

Fig. 4 shows the punches on an enlarged scale, and Fig. 5 shows the strip of metal and the effect on the same as produced by each punch.

D is a cam placed on the end of the driving-shaft A′ to operate the feed-lever D′, at the lower end of which the adjustable feed-pawl enters the depressions made in the metal strip to form the eyelet, and feeds the strip to the punches.

E is the back shaft, driven by means of the beveled gears F F′ and the shaft F′ from the driving-shaft, and at the same speed.

G is a double cam placed on the shaft E to operate the reciprocating carrier I and the bending-follower K, which is made to reciprocate vertically by means of the bell-crank lever K′, one end of which follows the cam and the other reciprocates the follower K, as is clearly shown in Fig. 2.

The cam H, also secured to the shaft E, operates the anvil L through the lever L′.

In Fig. 2 the three cams are shown in their relative positions. The cam operating the carrier I is shown in solid lines, the cam operating the anvil L in alternately a long and a short heavy line, and the cam for operating bending-plunger K in a broken line.

M is a stripper, by which the lacing-hook is stripped from the bending-plunger to be discharged.

N is the receiving-die in the carrier. It is constructed to receive the punched-out blank, and provided with the recessed shoulders $n\ n$, on which the flange surrounding the eyelet rests, and the recessed shoulder $n'$, on which the cupped cap of the lacing-hook rests.

$o$ is the discharge-opening in the carrier I.

Referring, now, to Fig. 7, the receiving-die is shown transverse to the carrier I, and a top view of the same is shown in Fig. 6. When the blank has been cut from the strip it falls into the receiver N, which at that time is directly under the punch $d$. The carrier now moves the blank under the plunger K, the anvil being then in the position shown in Fig. 8. The bending-plunger K descends, bending the lacing-hook, as is shown in Fig. 9, and drawing the same into the central opening, $n^2$, of the receiving-die N, the plunger K at the same time bending the sides of the neck, as is shown in Fig. 10. The anvil L and the bending-plunger K now rise, with the lacing-hook, into the position shown in Fig. 11, the bent lacing-hook, by the spring of the metal, adhering to the bending-plunger K. The anvil L descends, and the carrier now moves again, as indicated by the arrow in Fig. 11, so as to bring the receiving-die under the punch $d$ to receive a new blank. The discharge-opening $o$ is at this time under the bending-plunger K, which, by rising in the slot of the stripper M, strips the lacing-hook off and allows the same to fall through the opening $o$ into a proper receptacle. The configurations of the paths in the cams are such that the movements of the bending-pluger, the anvil, and the carrier are all performed at each revolution of the main shaft, so that at each reciprocation of the plunger C' a blank is cut out, bent, and discharged.

To allow the carrier to pass over the anvil the metal of the carrier between the opening $o$ and the receiving-die N is cut away, so as to form a groove, as is shown in Figs. 2 and 11.

By this improved arrangement the construction of lacing-hook machines is simplified, and as the carrier has only one short and fixed reciprocation the machine can be run at a higher speed than lacing-hook machines as heretofore constructed. There are fewer parts to be operated and kept in adjustment, and consequently less liability of wear and injury to the blanks, or of the production of damaged goods.

The device for feeding the strip to the punches, consisting of the cam D and hinged lever D', is made so as to be adjustable by hinging the feeding-pawl 3 in the arm 2, which is secured to the lower end of the lever D' by a stud, the end being held between the set-screws 1 1. As the punches $a$ and $b$ must enter the strip exactly at the place where the eyelet has been formed on the same, the feeding-pawl can be adjusted by means of the screws 1 1 to feed the strip with great accuracy.

Having thus described my invention, I claim as new and desire to secure by Letters Patent—

1. In a lacing-hook machine, the combination, with the plunger C' and the punches $a\ b$ $c\ d$, of the carrier I, provided with the receiving-die N and opening $o$, the anvil L, and bending-plunger K, constructed to bend the lacing-hook and discharge the same at one reciprocation, as described.

2. In a lacing-hook machine, the combination, with the punches and bending-plunger, of a carrier provided with the receiving-die N, having the recessed shoulders $n\ n$, the central slit, $n^2$, and bearing $n'$, constructed to support the blank and allow the plunger to descend and bend the same, as described.

3. The combination, with the reciprocating plunger C', having the punches $a$, $b$, $c$, and $d$ secured thereto, and the driving-shaft A', of the beveled gears F F, the shaft F', the shaft E, the cams H and G, the carrier I, anvil L, and bending-plunger K, constructed to punch the blank and bend the same, as described.

In witness whereof I have hereunto affixed my name.

WILLIAM HALKYARD.

Witnesses:
WM. L. ROOT,
J. A. MILLER, Jr.